United States Patent [19]

Bischof

[11] Patent Number: 5,641,360

[45] Date of Patent: Jun. 24, 1997

[54] PROCESS AND DEVICE FOR IMPROVING THE TREATMENT OF SEWAGE SOLIDS

[75] Inventor: Rudolf Bischof, Eching, Germany

[73] Assignee: Rudolf Bischof GmbH, Eching, Germany

[21] Appl. No.: 524,126

[22] Filed: Aug. 29, 1995

Related U.S. Application Data

[63] Continuation of Ser. No. 178,278, filed as PCT/DE92/00557, Jun. 6, 1992, published as WO93/01000, Jan. 21, 1993, abandoned.

[30] Foreign Application Priority Data

Jul. 5, 1991 [DE] Germany .................. 41 22 366.7

[51] Int. Cl.⁶ .................................................. B08B 1/04
[52] U.S. Cl. .................. 134/10; 134/25.1; 134/33; 134/65; 134/132
[58] Field of Search .................. 210/772, 787, 210/159, 162; 134/10, 25, 33, 42, 65, 110, 111, 132

[56] References Cited

U.S. PATENT DOCUMENTS

| | | | |
|---|---|---|---|
| 573,687 | 12/1896 | McDaniel | 134/65 X |
| 1,601,497 | 9/1926 | Greene | 134/132 X |
| 2,086,181 | 7/1937 | Bonotto | 134/65 X |
| 2,266,937 | 12/1941 | Tark | 210/772 |
| 2,654,479 | 10/1953 | Driessen | 210/787 X |
| 2,915,369 | 12/1959 | Oaks et al. | 210/787 X |
| 2,929,504 | 3/1960 | Lind et al. | 210/162 X |
| 3,019,895 | 2/1962 | Loevenstein et al. | 134/132 |
| 3,875,319 | 4/1975 | Seckler et al. | 210/787 |
| 4,165,289 | 8/1979 | Borst | 210/27 |
| 4,338,197 | 7/1982 | Bolton | 210/621 |
| 5,009,795 | 4/1991 | Eichler | 210/744 |
| 5,061,375 | 10/1991 | Oyler | 210/744 |

Primary Examiner—Donald E. Czaja
Assistant Examiner—Sean Vincent
Attorney, Agent, or Firm—Max Fogiel

[57] ABSTRACT

Treatment of sewage solids, sand, rubbish and the like, especially for the dumping and/or incineration with a reduced pollutant and moisture content, or similar disposal with the mechanical separation of the solids from a solid-liquid mixture, in which, to obtain the best possible dumping and incineration properties according to moisture and pollutant content, there is a vortex device with the aid of which organic substances adhering to the solids are dissolved and removed with the liquid, preferably to a further biological waste water treatment system, where the treatment of dirty waste water is concerned; in a similar manner, sand, rubbish and similar substances are treated even if they do not form part of waste water.

14 Claims, 6 Drawing Sheets

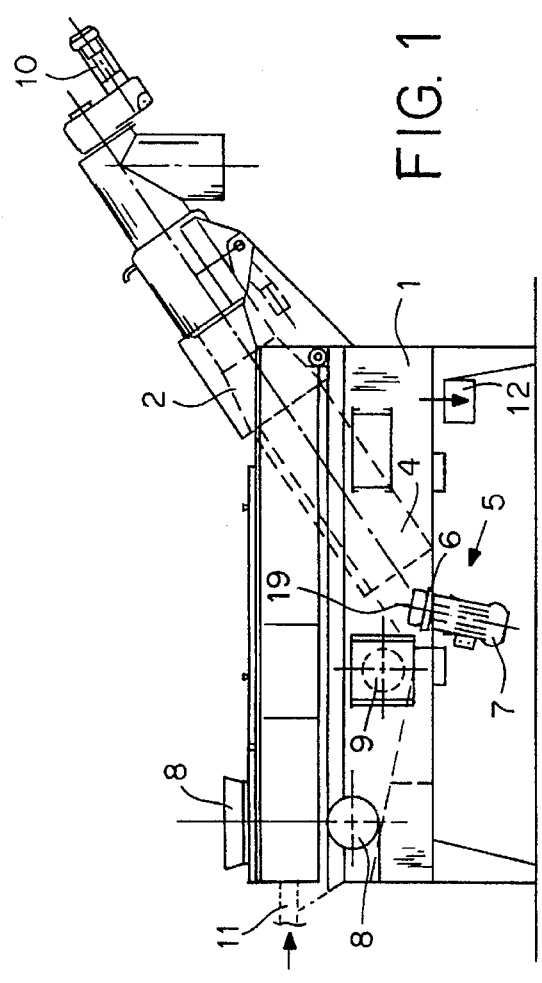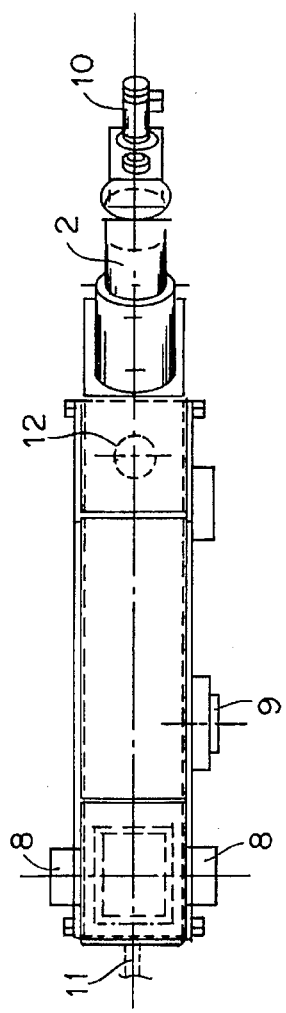

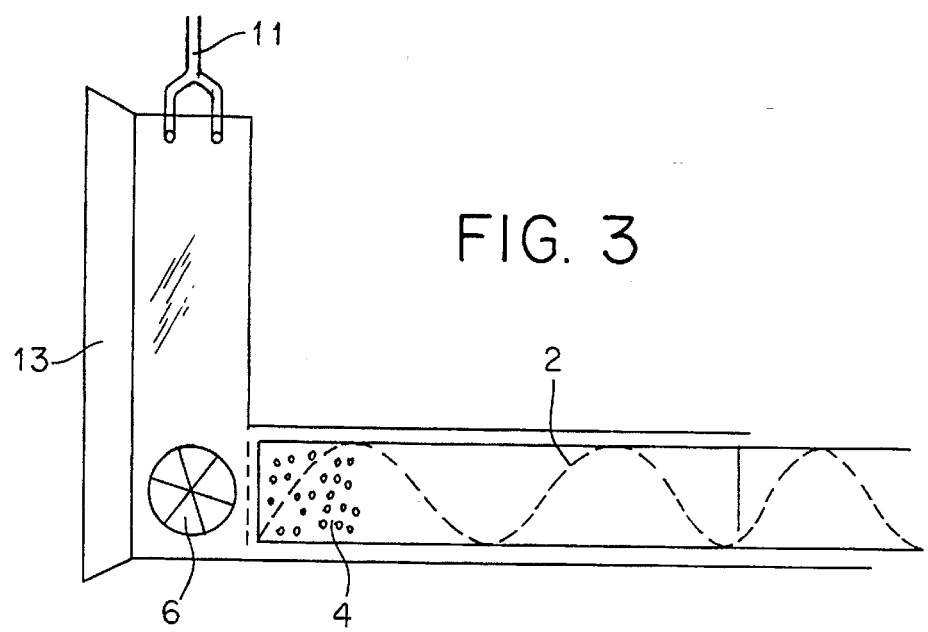
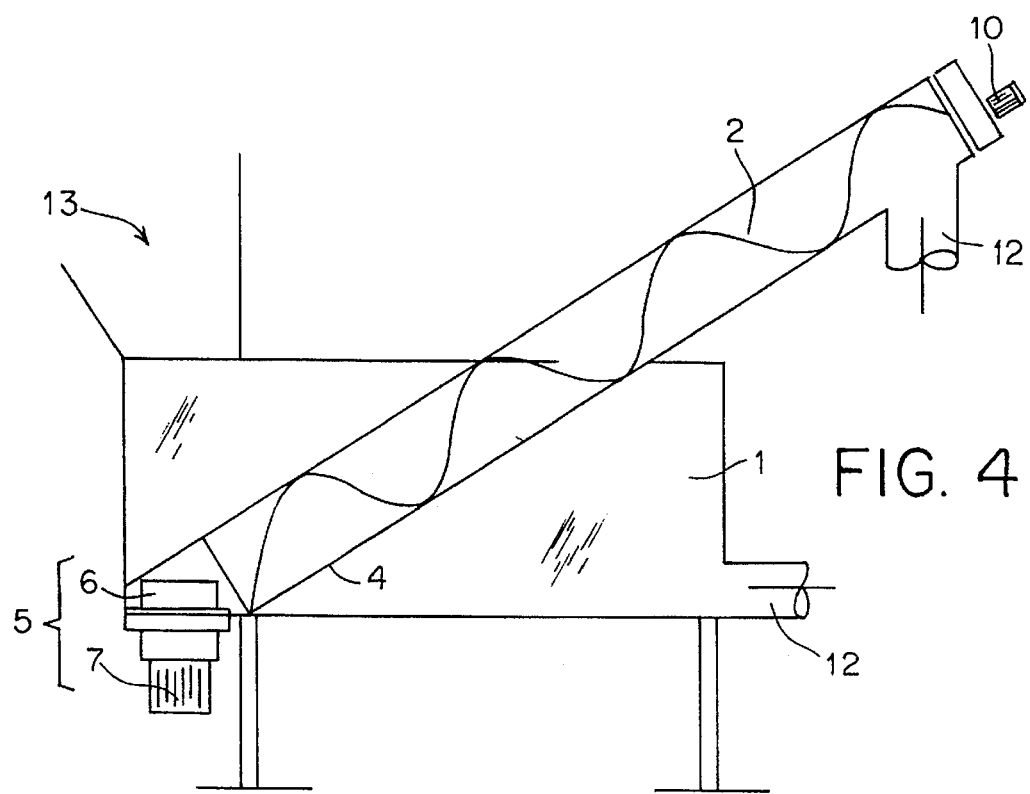

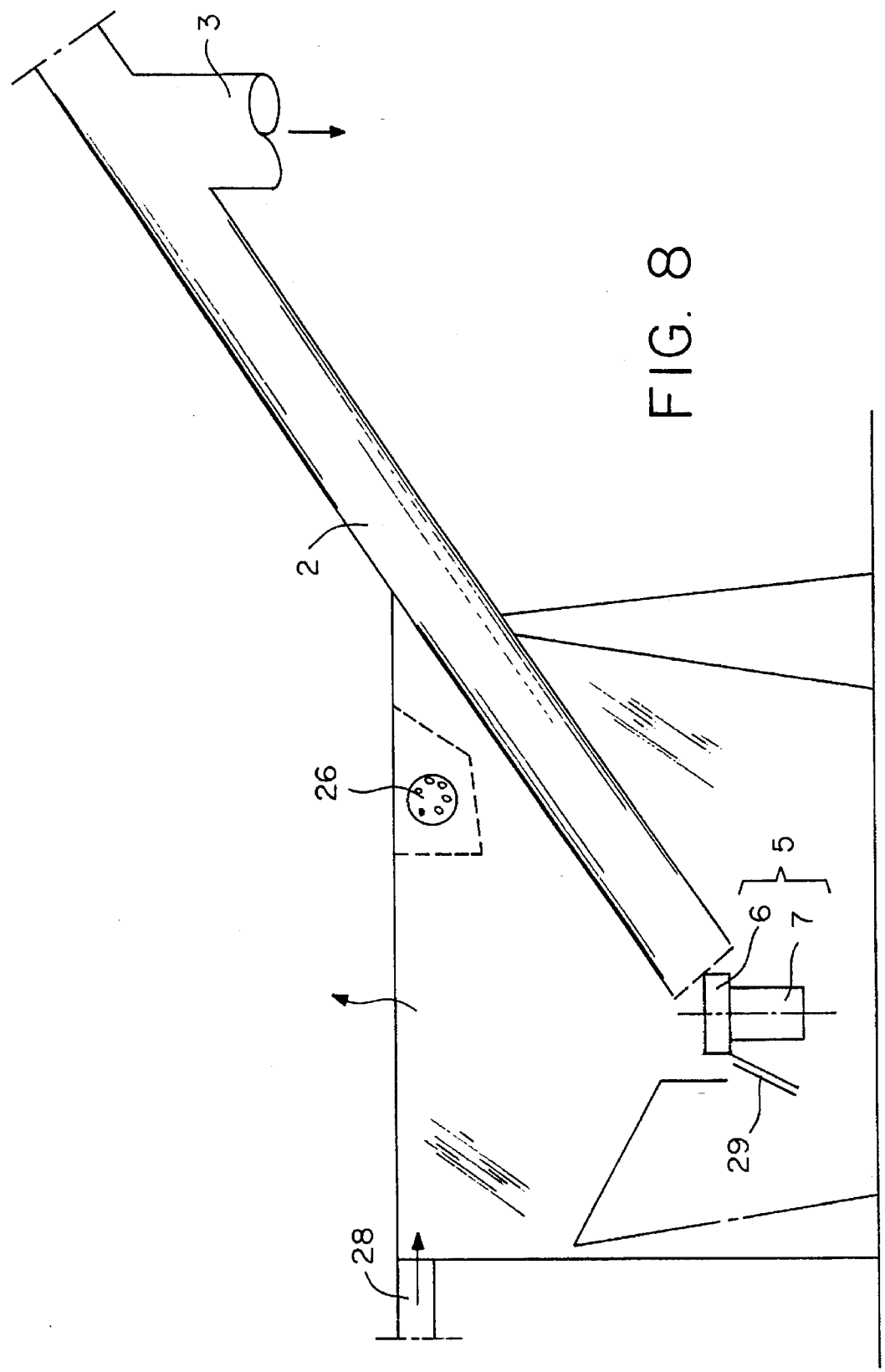

PROCESS AND DEVICE FOR IMPROVING THE TREATMENT OF SEWAGE SOLIDS

The present application is a continuation of the parent application Ser. No. 178,278, filed as PCT/DE92/00557, Jun. 6, 1992, published as WO93/01000, Jan. 21, 1993 now abandoned.

BACKGROUND OF THE INVENTION

The present invention relates to an improved treatment of sewage solids, sand, rubbish and similar solid matter of more or less big particle consistency, to which organic substances adhere, which are filtered out at more or less high proportions of a solid-liquid mixture and are removed, especially dumped or incinerated, whereas the residual liquid correspondingly more or less freed of solids is preferably passed to a biological waste water treatment system (clarification plant).

In waste water treatment systems, the first treatment stage is a so-called mechanical treatment stage which, as rule, consists of a so-called rake or screen system and a sand catcher.

It is known to lift solids out of a raceway (particularly one of a bigger size) with the aid of rake conveyors and to discharge the solids into containers or comminutors. It is further known (especially with narrow raceways) to use sieve filter means with an associated conveying worm which then pass the solids discharged from the raceway to a container or subsequent treatment system.

Finally, it is known to generally comminute and squeeze the accumulating solids, for example, by means of a comminution pump or centrifugal device.

Solids which have settled in the sand catcher are normally conveyed by means of pumps or similar apparatus to a sand container or a so-called sand classifier.

This mechanical sewage treatment stage, of whatever type it may be, is followed by a biological waste water treatment system (clarification works) serving to decompose organic substances, i.e. the process which takes place there operates with organisms decomposing the organic substances.

Solids (rakings, sievings or sand) filtered out by the mechanical sewage treatment stage, but also substances not carried along with waste water, such as rubbish, contain many organic components. At present, these organic components mostly end up at the dump or incineration plant, along with the rakings, sievings, sand or rubbish. This is harmful and should be avoided.

SUMMARY OF THE INVENTION

Therefore, it is an object of the present invention to provide a device of the type as mentioned above, allowing solids to be filtered out of waste water as well as other accumulating solid matter to be treated for better disposal, especially for better dumping and/or innocuous incineration.

According to the invention, this is attained by that solids, in the presence of liquid, are freed of organic substances by a locally defined and concerted swirling (washing), said organic substances being subsequently removed with the liquid phase, whereas the solids so treated are passed to the dump, incineration or similar further treatment with a reduced pollutant and moisture content. To this end a vortex device is used, having a motor-driven highspeed vortex wheel inserted in a region of a solid-liquid mixture.

Accordingly, solids which are to be removed for example from waste water, are subjected to a washing process either beforehand or afterwards, in which organic substances are washed off the remaining solids, partly under gentle comminution (e.g. toilet paper). As a result, organic substances do not reach the dump or incineration together with the solids, but are passed to the treatment works. This especially applies also to sand and further to rubbish and the like, i.e. to solids which do not necessarily form part of waste water. As far as solids do not come up in a solid-liquid mixture, they can be mixed with a washing liquid for the treatment according to the invention so that a mixture is obtained allowing the solids to be freed of adhering organic substances according to the process of the invention.

The residual substances, which are washed out, are retained and disposed as usual. These residual substances are concerned with material which is undesired in a waste water treatment system (fiber material, plastic parts, sand and other inorganic parts).

In this way also a reduction of the volume of refuse (up to 80%) as well as a higher degree of desiccation are obtained, because the organic substances as moisture carriers are dropped. This degree of desiccation can be quite considerable, increasing for example from presently 20% to more than 50% of dry substance.

A device for carrying out the above-described process includes as a main component a vortex device, preferably in the form of a rotating wheel which can have radially directed webs or arcuate blades and the like, i.e. shapes that can be adapted as far as possible to the medium. This vortex device, respectively vortex wheel is arranged either in front of the device lifting the solids out of the raceway or a tub (a worm conveyer with sieve screen, a paternoster rake etc.) or secondary thereto, in the latter case, however, usually in association with a container.

Accordingly, there is assured on one hand that a swirling action takes place in a raceway or container and so organic substances are washed out ahead of a sieve screen or a rake, so that the waste water with the organic substances but without the coarser solids to be removed passes the sieve screen and/or rake and is conveyed to the treatment works. On the other hand it is also possible first to transport the solids in their (coarser) totality out of the waste water to be treated and then to wash the organic substances as provided according to the invention. In such a case, the solids will be preferably compacted when the organic substances have already been washed out. But out of consideration for existing systems, also the compacted material, which has been lifted out of the waste water already, can be subjected to the washing process according to the invention and must be re-compacted, if necessary. It should be noted that for the washing of the organic substances feeding of washing liquid may become necessary, which may either be liquid obtained from pre-treated waste water or industrial water.

The dilution obtained by the addition of washing liquid and, consequently, improved washing (separation of organic substances from the solids) can be promoted by the addition of pressurized air or a gas-liquid mixture through a nozzle system in the region of the washing device, also considering the addition of substances promoting the stripping of these organic substances.

As has been mentioned already, the treatment according to the invention is not limited to waste water passed to treatment works, but is also suitable in this way for refuse or sand. For this purpose containers smaller or bigger in size can be provided, into which sand or refuse is filled and washed out in the above-described manner. This, too results in the important effect of improving the dry substance of the material obtained, which is to be dumped or incinerated.

As far as the device is concerned, there are various possible ways for effecting the washing. In any case, a certain amount of liquid is required to separate the solids from the organic substances. Corresponding provisions can be made for example in a portion of a raceway prior to lifting the solids out of the raceway by producing a certain bank with the aid of a weir. If the washing device is arranged after the removal of the solids from the raceway or if rubbish or sand are washed, a container will be provided fed with both the solids and washing water. The washing process itself requires a certain volume of this mixture, which can be ensured by the installation of a corresponding weir arranged between the washing device and the device which then discharges the solids which have been washed out. However, said weir, which is to be actuated separately, may be omitted if the discharging device is provided with sieve means through which the liquid is discharged with the washed-out organic substances. In principle, continuous operation is possible, however, intermittent operation with washing in batch quantities is preferred, considering that the washing takes place in a container and that different substances and/or mixtures accumulate which have to be treated correspondingly.

For example, operation of a conveying worm is adapted to take place in response to accumulated solids, i.e. the conveying worm is not operated continuously and washing takes place during the inoperative period, resulting in that the sieve screen gets obstructed by the solids which have been washed out. In this way the desired pool level for washing is obtained. Thereafter, operation of the conveying worm is started in order to discharge the accumulated solids. In a preferred embodiment such intermittent operation can be varied in a manner allowing the worm conveyor to revolve several times in a direction opposite to the conveying direction to feed the solids in the direction opposite to the conveying direction to wash them one more time and to free the sieve screen of deposited solids. It may be considered, for example, to have the conveying worm move back several times for several seconds at a predetermined timing when a corresponding pool level has built up. As soon as a sufficient amount of washed-out solids has accumulated, the worm is operated in the coveying direction for several minutes whereby the treated solids are discharged, whereas the liquid with the washed-out organic substances is discharged through the sievescreen of the worm conveyor means (treatment works). It is basically known to provide the worm helix on its radially outer edge with brush means so that the sieve jacket surrounding the worm is kept clean. By virtue of the present mode of operation in both rotational directions the worm helix is preferably provided with brushes on both front sides, i.e. on the front side in the direction of conveyance and on the front side opposite to the direction of conveyance. As a result, the brush arranged to be forewardly facing in the respective conveying direction and loaded by pressure takes the major part of the sieve cleaning work and consequently of the corresponding mechanical load, whereas the brush following up and subjected to tensile load, has to bear smaller loads. This has a favourable effect on the fixing and results as a whole in reduced wearing of the brushes. Yet, in order to take into account the wear of the brushes, there is provided a brush support allowing radial adjustment of the bristle bed. The bristle bed is fixed to a support, connected to the helix by screws, in such a way that the bristle bed can be displaced in its longitudinal direction upon loosening the screwed connection. Accordingly, the farther the bristle bed comes in the radially outward direction, the shorter the brush extension will be in the axial direction, the order of magnitude being within the range of centimeters only.

The washing process can be carried out also in a container which is more or less funnel-shaped, on the bottom of which a vortex wheel pump is seated. The pressure side of the pump housing is screwed to a slide. The vortex wheel pump (the shape of the impeller being adapted to the medium and, as a rule, being a disc with webs or vanes) has two functions, namely on one hand a swirling and washing function with the slider being in its closed position, in this case, too an additional washing effect is obtainable by frequently changing the rotational direction, and on the other hand the function of discharging the treated material and the residual water with the slide being in its open position. The container itself has one or more discharge passages and one or more feed passages. A washing liquid, a gas-liquid mixture or air can be added through the feed passages.

The organically polluted waste water flows back into the waste water treatment system through the discharge passages. The washed-out substances remain in the lower funnel tip and in the pump housing. By opening the slide gate and simultaneous running of the vortex wheel the vortex device works as a pump. Accordingly, the residual substances can be pumped to the desiccation container, a centrifuge or other system for further treatment.

In principle, it is possible to arrange the driving motor for the vortex wheel outside the mixture. In such a case, however, the shaft extending through the mixture for driving the vortex wheel will be allowed to run within a tube to prevent that fiber material collects around the shaft. But in a specially preferred manner the vortex wheel will be connected, however, directly to the driven shaft of the driving motor aggregate—to the electric motor itself or to an driven shaft of a secondary transmission —namely close to the exit of this driven shaft from the case of the driving motor aggregate. In this way especially fibrous substances are prevented from accumulating to thicker bales around the rotating shaft between the driving motor aggregate and the vortex wheel.

If the vortex wheel has a gap on its periphery towards a pan and/or stationary surroundings, the danger exists that long-fiber substances such as stockings and the like or also sand will accumulate and/or get stuck, at least impairing or even preventing the running quality of the vortex wheel. As a counter measure a passage is provided from the bottom side, i.e. outside the space of the washing pan, which terminates in the region of said annular gap. Also plural gaps can be provided distributed over this circumference. Through said passage water or air are supplied. By the rotation of the vortex wheel, however, this annular gap is circumferentially cleared merely on one location, even if water and/or air are fed. If air is used, which is strongly swirled by the vortex wheel rotating at a high speed, small air bubbles will be produced with adherent fine solids which together with the air bubbles drift to the surface where they form a surface scum. This surface scum can be removed with the air of a special device. The idea of supplying gas, a gas-liquid mixture and/or air meets the idea of introducing air into the region of swirling for increasing flotation.

BRIEF DESCRIPTION OF THE DRAWINGS

This and further embodiments of the invention will be evident from the subclaims, especially in conjunction with the examples reflected in the drawings especially referred to hereinafter and more closely describing the invention. There is shown in:

FIGS. 1 and 2 a side and top view, respectively of a schematic system for vortex washing of rakings in a container;

FIGS. 3 and 4 a schematical side and top view, respectively of an angular arrangement of a container for the washing of rakings;

FIG. 8 a schematical side view of a sand washing system in a sand classifier.

DESCRIPTION OF THE PREFERRED EMBODIMENTS

Figure 5:
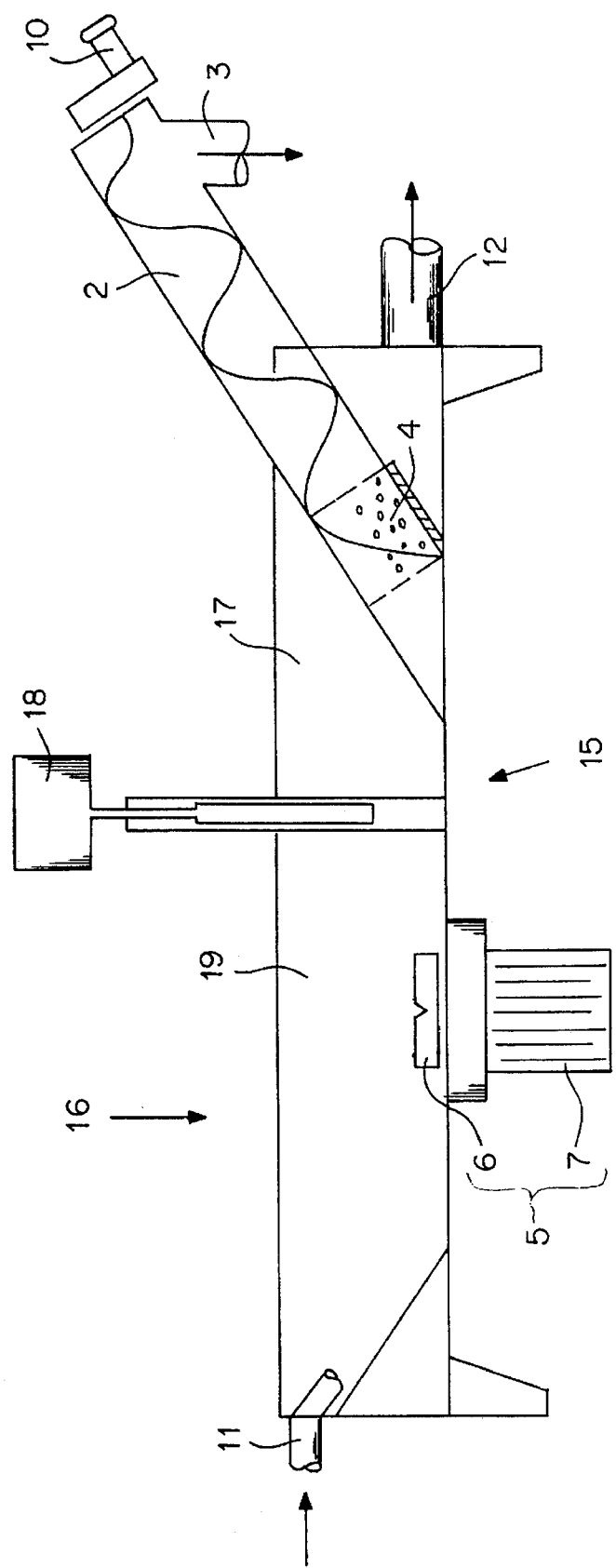
FIG. 5 a schematical side view of a temporary container for vortex washing of rakings.

The prototype schematically represented in a side and top view in FIGS. 1 and 2 is concerned in the first line with the idea that solids lifted out of a raceway by means of a paternoster rake, which by virtue of its discontinuous grading also performs a sieve function, or by means of a conveying worm having a sieve-shaped jacket in the region of the raceway, are discharged to a container 1 to be subjected therein to an aftertreatment aiming at the removal of adherent organic substances from the solids to a greatest possible extent. If these solids are coarser in structure, they can be subjected to a certain communition either before they reach the container but also within the container which is described in the following. On the other hand, this container can be charged also with solids which similar to the afore-mentioned solids comprise, for what reason ever, surface-adhering organic substances, for example, sand other than that which is accumulated in the course of sand catching with waste water and is to be treated otherwise, but especially also rubbish which is to be passed to the dump or incineration.

In a manner known per se, there is introduced in the container 1 a "sieve worm" which in its portion immersing in the solid-liquid mixture region has a jacket 4 provided with sieve-shaped perforations or other liquid-permeable construction surrounding the radially outer portion of its helix. This known idea starts from the fact that the solid-liquid mixture entering the zone of the worm inside the sieve-shaped jacket is freed of solids by the conveying action of the worm, which solids are discharged to a container (pos. 21 in FIG. 6) by a solids ejector 3 after having been conveyed in the upwardly inclining conveying direction of the worm and, after liquid still adhering to them has been removed in a squeezing section to the usual extent, if necessary. Said squeezing zone can be variously designed in a known manner, for example, by reducing the helix spacing of the conveying worm in this portion or by changing the diameter or alone by the fact that the solids are conveyed by the worm towards the area of the solids ejector 3 solely by the application of pressure.

The special embodiment which is of interest here consists in that in the region 19 more or less directly locating in front of the beginning of the conveying path through the sieve worm 2, where a solid-liquid mixture still exists, a vortex device 5 is arranged with the aid of which the solids within this mixture are subjected to turbulence in order to separate organic substances adhering to these materials and to pass them with the liquid component through the sieve jacket 4 to a washing water discharge 12.

In the scope of the present considerations, the above-described principle quite generally applies. Being concretely directed to the embodiment according to FIGS. 1 and 2, solids are introduced at pos. 8, either so as to fall down from the top or so as to enter laterally, assisted by mechanical flushing. By feeding washing water through the inlet 11, the solids are then mixed to a solid-liquid mixture capable of being swirled and after their treatment by the vortex device 5 the solids are separated by means of the sieve worm 2 in solid matter freed of organic substances, on one hand, and in waste water correspondingly polluted by organic substances, on the other hand, the waste water being discharged through the washing water outlet 12, especially to a biological further treatment system such as clarification works.

Concerning its swirling action, the vortex device 5 consists of a vortex wheel 6 driven by a driving aggregate 7 at relatively high rotational speeds. As can be seen from FIG. 1, it is only the vortex wheel 6 which projects into the region 19 of the mixture immediately in front of the beginning of the conveying path of the sieve worm 2, whereas the driving motor aggregate 7 locates underneath a corresponding bottom wall and, as a matter of course, is constructed to be liquid-tight with regard to its driven shaft relative to the vortex wheel. The driving motor aggregate 7, to which the driven shaft of the vortex wheel is fixed, can consist exclusively of an electric motor. However, in a preferred manner, a driving motor can be concerned having a secondary transmission in order to provide on its output, i.e. the driven shaft, a rotational speed of the vortex wheel which is appropriate for the respective treatment of the solid-liquid mixture intended for separating organic substances. The vortex wheel may have vane-shaped ribs which, in a manner known per se, are simply arranged to be radially extending. However, there can be concerned also arcuate vane walls and the like which deviate from the afore-mentioned ribs with respect to the radius.

Systems of the type discussed above are known, with the exception of the vortex device. Concerning their lifting means like rake or worm, these systems frequently work in batch quantities, i.e. in response to the accumulated solids and/or the liquid bank resulting in response to the accumulated solids. On using the device in direct connection with waste water raceways, switching-on of the rake or worm is controlled in direct response to the liquid level. However, working in batch quantities is also possible, as it is usual especially in conjunction with the separation of the solid-liquid mixture in a container.

To protect the devices for lifting and filtering the solids out of the solid-liquid mixture from being obstructed and to utilize such obstruction at most in terms of producing a dam for the vortex treatment, the driving system of these devices—i.e. of the rake systems having a sieve function and of the worm conveyor having a sieve jacket (as principally known)—is in a specially preferred embodiment (above all with regard to conveying worms) deviced and controlled through the worm driving motor 10 so that they allow backrunning in the direction opposite to the conveying direction. It is thereby attained that solids getting stuck, for example, in the sieve jacket of a conveying worm and obstructing the sieve are moved from this obstructing position back to the region of influence 19 of the vortex device 5, respectively the vortex wheel 6 by the worm being driven in the direction opposite to the conveying direction. Accordingly, it is in ones hands to repeat and thus intensify the swirling provided for separating organic substances adhering to the solids and at the same time to prevent that the bank which builds up in front of the conveying system becomes too big.

In this connection the following mode of operation can be given as an example: The conveying system (the rake and especially the worm conveyor) will be switched on at all only if solids have correspondingly accumulated and thus banked up. Thereafter, it will be differentiated between two operation phases, namely on one hand an operation phase wherein the conveyor is allowed to move in the direction opposite to the conveying direction for multiple times, interrupted by intermission periods, and thus feeding the solids back to the swirling zone and cleaning the sieve openings, and on the other hand a concerted conveying phase wherein the coveyor lifts accumulated solids out of the solid-liquid mixture and passes them over into a container or similar device for further conveyance, namely in a state in which the solids are farly free of organic substances as a result of washing by the vortex device.

FIGS. 3 and 4 show a variant of a container 1 with which a sieve rake (not shown) delivers solids separated from waste water through a throw-off chute 13. Washing water is supplied through an inlet 11, and the thus obtained solid-liquid mixture is laterally passed to portion 19 above the vortex wheel 6 of a vortex device 5 located immediately in front of the beginning of the conveying path of a conveying worm 2 which discharges at pos. 3 the solids that have been taken out of the container 1.

FIG. 5 shows a twin-chamber container 15 having a throw-in chamber 16 for feeding the material to be washed, for example solids lifted out of the waste water through a rake, which by means of a slide 18 is separated from a sieve chamber 17 following in the direction of flow, in which chamber 17 a worm conveyor 2 ends which is provided with a sieve 4, as this has already been described and is generally known. In the bottom portion of the throw-in chamber 16 a vortex device is arranged, the vortex wheel 6 thereof terminating in a collecting zone 19 of the solid-liquid mixture. As far as necessary, washing water is supplied through passage 11, a mixture which has collected in chamber 16 is subjected to washing in batch quantities by the vortex wheel 6, and a different batch is discharged with regard to its solids from the sieve chamber through the worm conveyor 2, whereas the washing liquid polluted by the washed-out organic substances is discharged through the washing water outlet 12.

Figure 6:
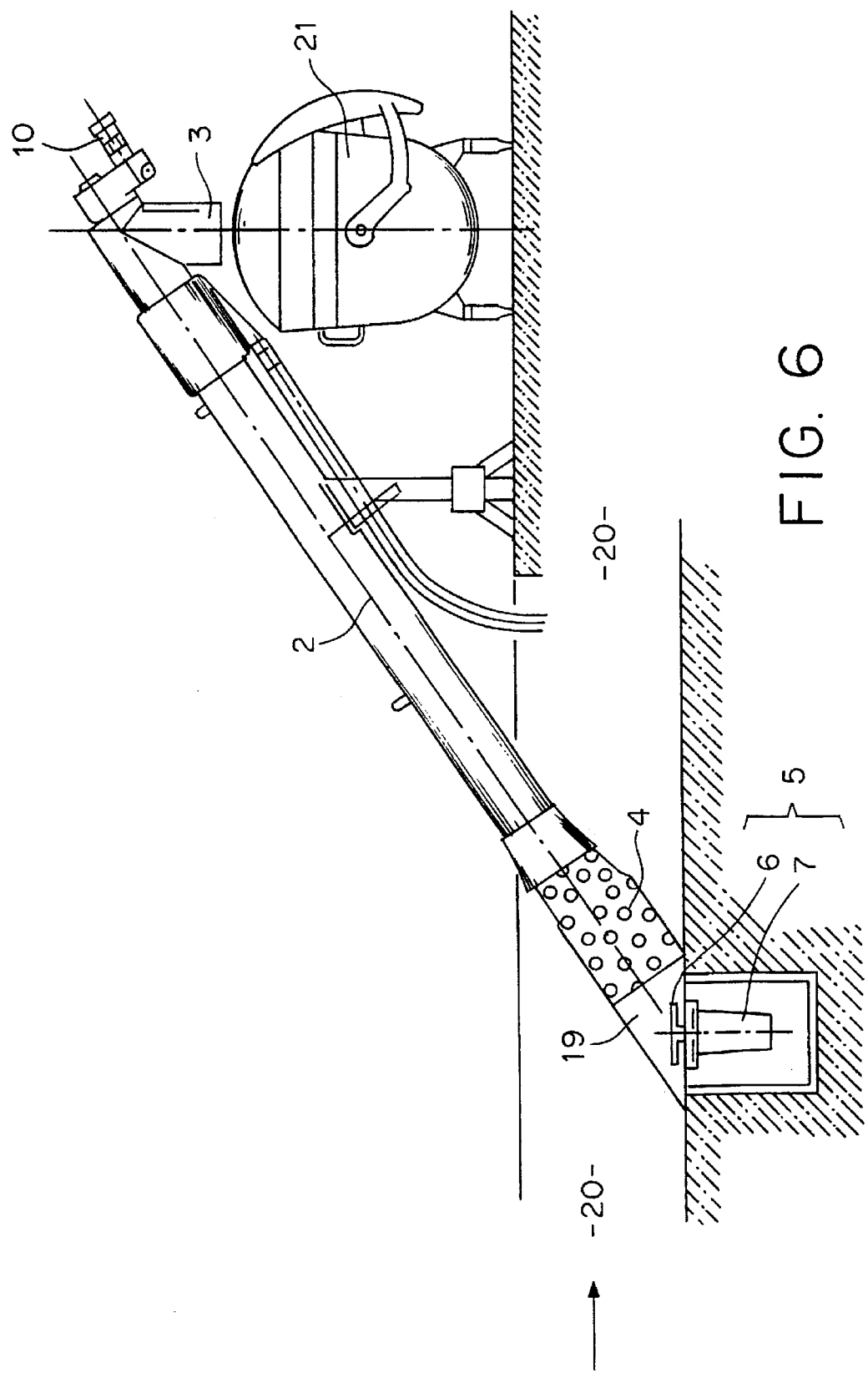
FIG. 6 a schematical side view of a system for vortex washing of rakings in a raceway.

In FIG. 6 there is shown the use of a vortex device in connection with a conveying device projecting into a raceway 20 and having a conveying worm 2 and a worm jacket 4 which is sieve-shaped within the zone of the raceway. This very simple construction is particularly interesting. The portion 19 directly in front of the beginning of the conveying worm 2 is given also with known systems of this kind. The vortex wheel 6 of the vortex device 5 projects into this portion, and in the present case in such a manner that the driving motor aggregate 7 of the vortex device is accommodated in a chamber underneath the bottom of the raceway 20, which means that in the present case it is in the form of a so-called watertight submersible device. With arrangements according to which the driving motor aggregate 7 is provided above the raceway and has a correspondingly long driving shaft which extends up to the vortex wheel 6, the danger exists that fibrous solids are collecting, causing obstruction. Accordingly, such driving shaft should be encapsulated between the driving motor aggregate 7 arranged above the raceway 20 and the vortex wheel 6 arranged near the bottom. As may be seen from this Figure, solids lifted out of the raceweay and washed can be passed to a container 21 by means of conveying worm 2, which as an example also applies to the other embodiments.

Figure 7:
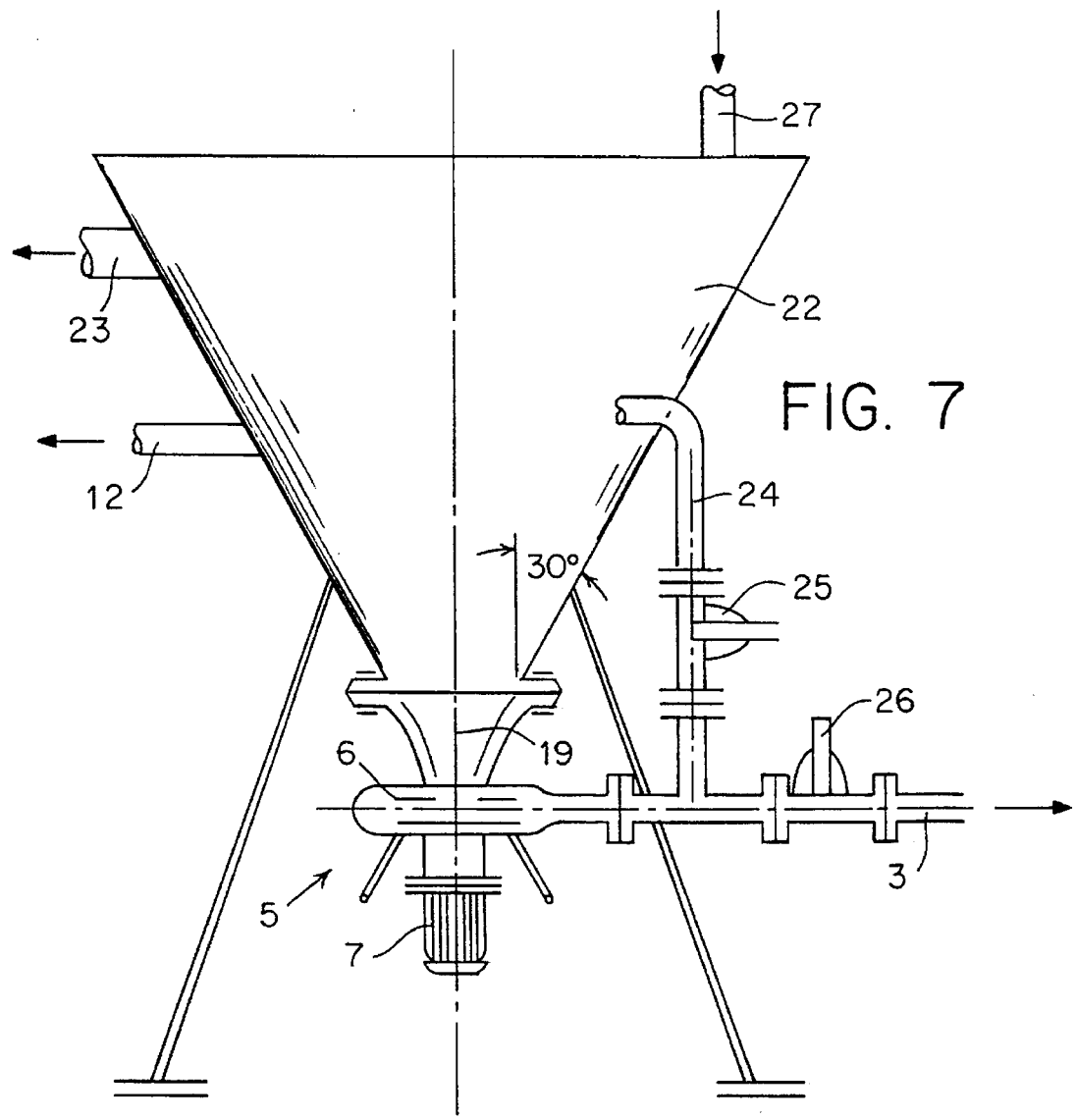
FIG. 7 a schematical side view of container means for sand washing.

FIG. 7 shows a funnel-shaped container 22 approximately symmetrically extending around a vertical axis, said container being upwardly expanding and having a vortex device 5 in the bottom portion thereof. Into the funnel portion, which is open towards the top, a solid-liquid mixture, especially a sand-water mixture, is introduced at pos. 27. This device, too works in batch quantities. After it has been filled to a certain level the vortex device is switched on so that solids collecting in the portion 19 in front of the vortex wheel 6 is thoroughly swirled in order to separate adherein organic substances adhering. A muddy water overflow is provided at pos. 23 and a washing water oulet at pos. 12. To avoid that the compaction in portion 19 above or within the area of influence of the vortex wheel 6 becomes too strong and yet to allow that washing takes place as thoroughly as possible, a by-pass 24 is provided with the aid of which material present within the area of the vortex wheel can be recirculated to the funnel-shaped vessel 22 at an upper location relative to the action range of the vortex wheel 6. The vortex wheel—in this case with radially protruding ribs—at the same time acts as a pump. As can be seen from the drawing, with the aid of this pumping action both the above-described recirculation through the by-pass 24 can become effective on opening a bypass slide 25 and when washing is concluded, with the vortex wheel 6 acting as a pump, the mixture with the solids freed of organic substances can be removed through a solids ejector 3 when a slide 26 provided therein is correspondingly open and the by-pass slide 25 closed.

FIG. 8 shows the use of the vortex device 5 for a sand classifier of usual construction. The sand classifier is arranged in the container-side end portion of conveyor means or of conveyors means performing the function of a "sand classifier" which has a discharge for treated sand at pos. 3, a muddy sand-water mixture inlet at pos. 28, a muddy water overflow at pos. 26 and a feed passage for washing water and/or air or a corresponding mixture at pos. 29. This feed passage 29 is concerned with portion 19 in the surroundings of the vortex wheel 6, but it is also important for keeping clean the transition between the vortex wheel 6 and the driving motor aggregate 7 and/or a support wall arranged therebetween so that solids there collecting can be removed by the washing liquid or air stream in order not to impair the movement of the vortex wheel. Feeding of washing liquid or air is important also for the above-described embodiments, namely in terms of better swirling or floatation, and here additionally serves for mechanically keeping the vortex wheel freely movable.

I claim:

1. A process for improving treatment of sewage solids, sand and garbage for pollutant and moisture-reduced dumping as well as incineration, comprising the steps of: feeding a liquid-solid mixture to a locally defined swirling zone; swirling said liquid-solid mixture in said locally defined swirling zone to free solids in a mixture of organic substances; discharging subsequently said organic substances with the liquid phase and passing said organic substances with the liquid phase to a biological waste water treatment system; separating the solids from said liquid-solid mixture; and feeding back the already treated solids repeatedly to said locally defined swirling zone directly in front of a beginning of a conveying path of a screw conveyor having a screen to further increase separation of solids from said liquid-solid mixture during each feeding back step and transferring the solids to a dump, incineration, or moisture reducing means.

2. A process as defined in claim 1, wherein the solids are fed to said swirling zone intermittently in batches.

3. A process as defined in claim 1, wherein the solids are swirled and thereby washed before lifting out of muddy waste water in a duct.

4. A process as defined in claim 1, wherein swirling and thereby washing of the solids is performed in a container.

5. A process as defined in claim 4, wherein solids lifted out of corresponding muddy waste water or solids accumulating outside of waste water are mixed with washing liquid, pre-treated waste water or industrial water before being swirled and thereby washed.

6. A process as defined in claim 1, including the step of supplying a gas or gas-liquid mixture to said swirling zone.

7. A process as defined in claim 1, wherein the solids are separated by lifting out of the liquid-solids mixture by said screw conveyor.

8. A process as defined in claim 7, wherein said lifting out of the solids by said screw conveyor is initiated only upon accumulation of solids of a specific amount and when feeding again the solids to said swirling zone, said screw conveyor is interrupted with a plurality of pauses thereby freeing the screen openings.

9. A process for improving treatment of sewage solids, sand and garbage for pollutant and moisture-reduced dumping as well as incineration, comprising the steps of:
   a. feeding a liquid-solid mixture to a locally defined swirling zone;
   b. swirling said liquid-solid mixture in said locally defined swirling zone to free solids in a mixture of organic substances; wherein the swirling includes:
      i. accumulating solids of a specific amount;
      ii. supplying a gas or gas-liquid mixture to said swirling zone;
   c. discharging subsequently said organic substances with a liquid phase and passing said organic substances with the liquid phase to a biological waste water treatment system;
   d. separating the solids from said liquid-solid mixture by lifting out said solids from said liquid-solid mixture by a screw conveyor having a screen;
   e. mixing solids lifted out of corresponding muddy waste water or solids accumulating outside of waste water with washing liquid, pretreated waste water or industrial water;
   f. washing said solids in a container;
   g. feeding back the already treated solids with said screw conveyor repeatedly and intermittently in batches to said locally defined swirling zone directly in front of a beginning of a conveying path of said screw conveyor to further increase separation of solids from said liquid-solid mixture during each feeding back step;
   h. interrupting said screw conveyor with a plurality of pauses when feeding again the solids to said swirling zone, thereby freeing screen openings;
   i. and transferring the solids to a dump, incineration, or moisture-reducing means.

10. An arrangement for improving treatment of sewage solids, sand and garbage for pollutant and moisture-reduced dumping as well as incineration, comprising: container means; swirling means having a vortex wheel in said container means to swirl a liquid-solid mixture for freeing solids in the mixture of organic substances, the freed solids and moisture with organic substances being removed; said swirling means being located in a region of said liquid-solid mixture directly in front of a beginning of a conveying path of a screw conveyor, said screw conveyor being reversibly controlled at specific intervals of time; and a screened jacket for separating the solids and feeding the solids back to the swirling zone.

11. An arrangement as defined in claim 10, wherein said container means has an inlet opening for the solids and an inlet opening for liquid washing material, a screw screen conveyor for washed solids, an exit opening for waste water laden with washed organic substances, and said swirling means.

12. An arrangement as defined in claim 10, wherein said swirling means is liquid tight relative to said container means.

13. An arrangement as defined in claim 10, including motor means for driving said vortex wheel rapidly in said swirling means directly in front of the beginning of said conveying path.

14. An arrangement for improving treatment of sewage solids, sand and garbage for pollutant and moisture-reduced dumping as well as incineration, comprising: means for feeding a liquid-solid mixture to a locally defined swirling zone; means for swirling said liquid-solid mixture in said locally defined swirling zone to free solids in a mixture of organic substances; means for discharging subsequently said organic substances with a liquid phase and passing said organic substances with the liquid phase to a biological waste water treatment system; means for separating the solids from said liquid-solid mixture and transferring the solids to a dump, incineration, or moisture reducing means; and means for feeding back the already treated solids repeatedly to said locally defined swirling zone directly in front of a beginning of a conveying path of a screw conveyor to further increase separation of solids from said liquid-solid mixture during each feeding back step.

* * * * *